(12) United States Patent
Johari (10) Patent No.: US 11,262,998 B2
(45) Date of Patent: Mar. 1, 2022

(54) INTELLIGENT PROVISIONING MANAGEMENT

(71) Applicant: VMware, Inc., Palo Alto, CA (US)

(72) Inventor: Gaurav Johari, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/923,204

(22) Filed: Jul. 8, 2020

(65) Prior Publication Data
US 2022/0012032 A1    Jan. 13, 2022

(51) Int. Cl.
*G06F 9/44* (2018.01)
*G06F 8/61* (2018.01)
*G06F 8/65* (2018.01)
*G06F 9/445* (2018.01)

(52) U.S. Cl.
CPC ............... *G06F 8/61* (2013.01); *G06F 8/65* (2013.01); *G06F 9/44505* (2013.01)

(58) Field of Classification Search
CPC ........... G06F 8/61; G06F 8/65; G06F 9/44505

USPC ....................................................... 717/106
See application file for complete search history.

(56) References Cited

U.S. PATENT DOCUMENTS

2016/0132299 A1 * 5/2016 Harrison .............. G06F 9/44505
717/107

* cited by examiner

*Primary Examiner* — Chuck O Kendall
(74) *Attorney, Agent, or Firm* — Thomas Horstemeyer, LLP (57) ABSTRACT

Disclosed are various examples of intelligent provisioning management. In some examples, device configuration signatures are received. Each device configuration signature includes a software configuration that specifies installed applications. A provisioning template is generated based on the configuration signatures. The provisioning template includes a superset of applications specified by a at least a subset of the configuration signatures. A user interface recommends applying the provisioning template to one or more client devices. A request is transmitted to one or more client devices to install an updated provisioning package based on the provisioning template.

20 Claims, 6 Drawing Sheets

INTELLIGENT PROVISIONING MANAGEMENT

BACKGROUND

With the emergence of connected provisioning and factory provisioning of managed enterprise devices, provisioning packages are becoming more important. Provisioning packages are also becoming more diverse or varied. Companies, organizations, and other enterprises can have multiple departments or user groups.

Enterprises can struggle to manage provisioning packages for their various divisions. A provisioning package with software, firmware, and configurations designed for supporting one division can be inadequate or inappropriate for another. In addition, the provisioning packages can become obsolete over time. Personnel and goals can change, resulting in updated applications, operating systems, firmware, and configurations.

Administrators can struggle to accurately identify enterprise provisioning needs, leading to ineffective provisioning packages and delayed rollout of provisioning packages. Even with factory or original equipment manufacturer (OEM) provisioning, new devices can require extensive updates on delivery. Manual updates can be time consuming and inefficient, causing delays in enterprise productivity. As a result, there is a need for more effective provisioning management in enterprise settings.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to intelligent provisioning management. Enterprises can struggle to manage provisioning packages with the emergence of factory or original equipment manufacturer (OEM) provisioning, new devices can require extensive updates on delivery. Manual updates can be time consuming and inefficient, causing delays in enterprise productivity. As a result, there is a need for more effective provisioning management in enterprise settings. However, the present disclosure provides mechanisms for intelligent provisioning management that increases efficiency of provisioning rollout and accuracy of enterprise needs.

Figure 1:
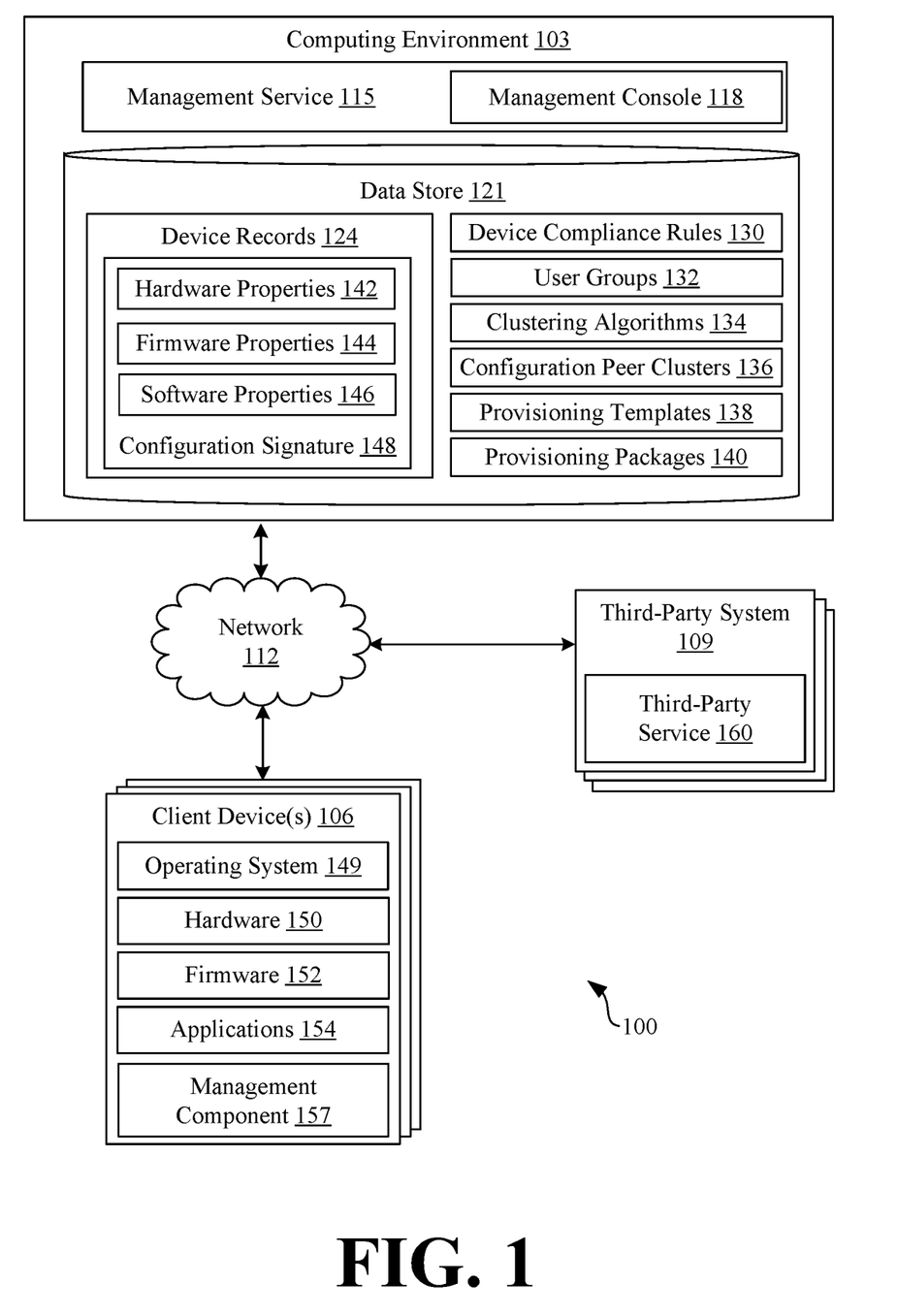
FIG. 1 is a drawing of a networked environment including a management service that implements intelligent provisioning management of client devices.

With reference to FIG. 1, shown is an example of a networked environment 100. The networked environment 100 can include a computing environment 103, one or more client devices 106, and a third-party system 109 (e.g., OEM environment) in communication with one another over a network 112. The network 112 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a remote computing environment 103.

Various applications can be executed in the computing environment 103. For example, a management service 115 and a management console 118, as well as other applications, may be executed in the computing environment. Also, various data is stored in a data store 121 that is accessible to the computing environment 103. The data store 121 may be representative of a plurality of data stores 121, which can include relational databases, object-oriented databases, hierarchical databases, hash tables or similar key-value data stores, as well as other data storage applications or data structures. The data stored in the data store 121 is associated with the operation of the various applications or functional entities described below This data can include one or more device records 124, device compliance rules 130, user groups 132, clustering algorithms 134, configuration peer clusters 136, provisioning templates 138, provisioning packages 140, as well as potentially other data.

The device records 124 can include hardware properties 142, firmware properties 144, software properties 146. The hardware properties 142, firmware properties 144, and software properties 146 can be considered a device-specific configuration signature 148 corresponding to a client device 106.

The management service 115 can be executed to oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. The management service 115 can further cause device records 124 to be created, modified, or removed from the data store 121. This can include creating or modifying a configuration signature 148 for a client device 106.

In various examples, the management service 115 can perform multiple verification steps to determine whether a client device 106 has been compromised. For example, the management service 115 can request that a client device 106 periodically requests the status of the firmware 152 on the client device 106. By performing various verification checks using a status response received from the client device 106, the management service 115 can determine if the status response can be trusted or if there is any indication of a compromise with respect to the client device 106. In some examples, the status response can include a public certificate associated with the client device 106 and the corresponding OEM of the client device 106. One verification step can include requesting certificate data from a third-party service 160 of the third-party system 109. The request can be in the form of an application programming interface (API) call or other type of request. If the certificate data received from the third-party service 160 fails to match the certificate data included in the received status response, the management service 115 can determine that there is a compromise with the client device 106 and that the status response is untrustworthy.

The third-party service 160 can refer to a service of a third-party entity such as an OEM or other provider of client devices 106. The third-party service 160 can provide configuration services for new client devices 106 that are delivered or otherwise provided to an enterprise.

The user groups 132 can refer to a group of user accounts with the management service 115. User groups can be created by an administrator of the management service such that a batch of client devices 106 can be configured according to common settings. For instance, an enterprise can create a user group 132 for the marketing department and the sales department, where client devices 106 in the marketing department are configured differently from the client devices 106 in the sales department.

The clustering algorithms 134 can refer to machine learning and other algorithms that take configuration signatures 148 as input to generate configuration peer clusters 136. For example, a clustering algorithm 134 can output a number of groups that indicate similarities between client devices 106 based on the hardware properties 142, firmware properties 144, and software properties 146 of the client devices 106. The clustering algorithms 134 can include regression algorithms, naive Bayes algorithms, K-means algorithms, random forest algorithms, and other types of clustering algorithms 134.

The provisioning templates 138 can specify firmware 152 and applications 154 including new firmware 152 and applications 154, as well as updated versions of the firmware 152 and applications 154 to be applied to specific client devices 106. For example, a provisioning template 138 can be applied to a group of client devices 106. The group of client devices 106 can include a group of client devices 106 corresponding to a user group 132 of an enterprise. The group of client devices 106 can include a group of client devices 106 corresponding to a configuration peer cluster 136.

The provisioning packages 140 can include the instructions and data required to install firmware 152 and applications 154 associated with a provisioning template 138. The firmware 152 and applications 154 can include new firmware 152 and applications 154 as well as updated versions of the firmware 152 and applications 154.

In various examples, the management service 115 can perform various compliance actions in response to determining that the status response is untrustworthy. Compliance actions can include, for example, generating and sending a notification of the compromise to an administrator of the enterprise environment, causing the client device 106 to be wiped or otherwise cleaned of various software or settings (e.g., reset to factory settings), restricting access to one or more applications, restricting access to different types of data (e.g., enterprise data), or other actions that can ensure safety of the enterprise with respect to a compromised device.

Commands issued by the management service 115 for client devices 106, such as to update settings specified in a configuration profile, may be stored in the command queue by the management service 115. As discussed later, the client device 106 may access the command queue and retrieve and execute any commands stored in the command queue for the client device 106.

The management console 118 provides an interface for client devices 106 to interact with and control the operation of the management service 115. Administrators and other users can interact with the management console 118. For example, the management console 118 can include a web server that generates one or more web pages that can be displayed on the client device 106. An administrative user can interact with the web pages served by the management console 118 to add, remove, or modify device records 124. For instance, the administrative user could use the management console 118 to define device compliance rules 130, add, remove, or update device records 124, and/or other actions. In addition, the management console 118 can also provide a public application programming interface (API) that is accessible across the network 112. Standalone applications installed on a client device 106 can call or otherwise invoke one or more functions provided by the API to programmatically control the operation of the management service 115, including adding, removing, or modifying device records 124.

A device record 124 can represent data related to a client device 106 enrolled with or otherwise managed by the management service 115. Various types of information or data can be stored in a device record 124, such as the owner or user of a client device 106, policies applicable to a client device 106, configuration settings for the client device 106, the type of client device 106 (e.g., laptop, desktop, smartphone, or tablet), the manufacturer of the client device 106, the model of the client device 106, a list of applications installed on the client device 106 and the respective version, as well as other data. For example, the device record 124 could include firmware properties 144 for the firmware 152 installed on the client device 106. A firmware property 144 can refer to a configuration profile for the firmware 152 installed on a client device 106. For example, the firmware properties 144 can store values for the current version of the firmware 152 installed or the version of the firmware 152 that is to be installed.

A firmware property 144 represents data regarding the firmware 152 installed on a client device 106. One example of a firmware property 144 is the current version of the firmware 152 installed on the client device 106. Another example of a firmware property 144 can include a status associated with the firmware 152. For example, a status can include an indicator associated with the current or prior status of the firmware 152. The status can indicate various factors such as, for example, lack of network, attestation pass, attestation failure, insufficient privileges for attestation, driver error, unsupported platform, nonce token verification failure, invalid signature, and/or other types of factors that can be associated with a firmware update.

Device compliance rules 130 include rules, models, and/or configuration data for the various algorithms or approaches employed by the management service 115. For example, the device compliance rules 130 can include the various models and/or algorithms used by the management service 115 in determining what type of compliance action to perform based on a received exit code, a detected device compromise, a detected untrustworthy status response, or other type of event. According to various examples, the device compliance rules 130 can be defined by an administrator of an enterprise via the management console 118.

A command queue can represent a set of pending commands or instructions issued by the management service 115 to one or more client devices 106. In some implementations, a command queue may be created for each client device 106 enrolled or registered with the management service 115. Configuration profiles, firmware status requests, or other commands or instructions for a client device 106 may be stored in the command queue. At periodic intervals, the client device 106 may retrieve the commands or instructions from the respective command queue for the client device 106. In other implementations, a single command queue may be used for all client devices 106. In these implementations, each command or instruction stored in the command queue may be tagged with a unique identifier for a client device 106. The client device 106 may, at periodic intervals, retrieve any commands or instructions from the command queue tagged with the respective unique identifier for the client device 106.

The client device 106 is representative of one or more client devices that may be connected to the network 112. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID), read or write capability, or other localized communication capability.

The client device 106 can include an operating system 149, hardware 150, firmware 152, applications 154, and a management component 157. The operating system 149, hardware 150, firmware 152, and applications 154 can be associated with corresponding operating system identifiers, hardware identifiers, firmware identifiers, and application identifiers. The operating system identifiers, hardware identifiers, firmware identifiers, and application identifiers can also indicate a version of the respective operating system 149, hardware 150, firmware 152, and applications 154.

The firmware 152 can provide low-level control of the operation of the hardware 150 of the client device 106. In some instances, firmware 152 can provide a standardized operating environment for more complex software executing on the client device 106. For example, the PC-compatible Basic Input/Output System (PC-BIOS) used by many desktops, laptops, and servers initializes and test system hardware components, enables or disables hardware functions as specified in the PC-BIOS configuration, and the loads a boot-loader from memory to initialize an operating system 149 of the client device 106. The PC-BIOS also provides a hardware abstraction layer (HAL) for keyboard, display, and other input/output devices which may be used by the operating system 149 of the client device 106. The Unified Extensible Firmware Interface (UEFI) provides similar functions as the BIOS, as well as various additional functions such as Secure Boot, a shell environment for interacting with the client device 106, network 112 connectivity for the client device 106, and various other functions. Other client devices 106 may use other implementations of firmware 152 (e.g., OpenFirmware/OpenBoot, Coreboot, Libreboot, and similar implementations)

A client device 106 can include an operating system 149 configured to execute various client applications. Examples of operating systems 149 include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. The client device 106 can also execute the management component 157.

The management component 157 can be executed by the client device 106 to maintain data communication with the management service 115 in order to perform various actions on the client device 106 in response to instructions received from the management service 115. In some instances, the management component 157 includes a separate application executing on the client device 106. In other instances, the management component 157 includes a device management framework provided by or included in the operating system 149 installed on the client device 106. The management component 157 can be configured to contact the management service 115 at periodic intervals and request that the management service 115 send any commands or instructions stored in the command queue to the management component 157. The management component 157 can then cause the client device 106 to perform the commands (e.g., provide status request, wipe client device 106, etc.) provided by the management service 115 or cause the client device 106 to modify the configuration settings installed on the client device 106 in accordance to any updated or received configuration profiles received from the management service 115.

Figure 2:
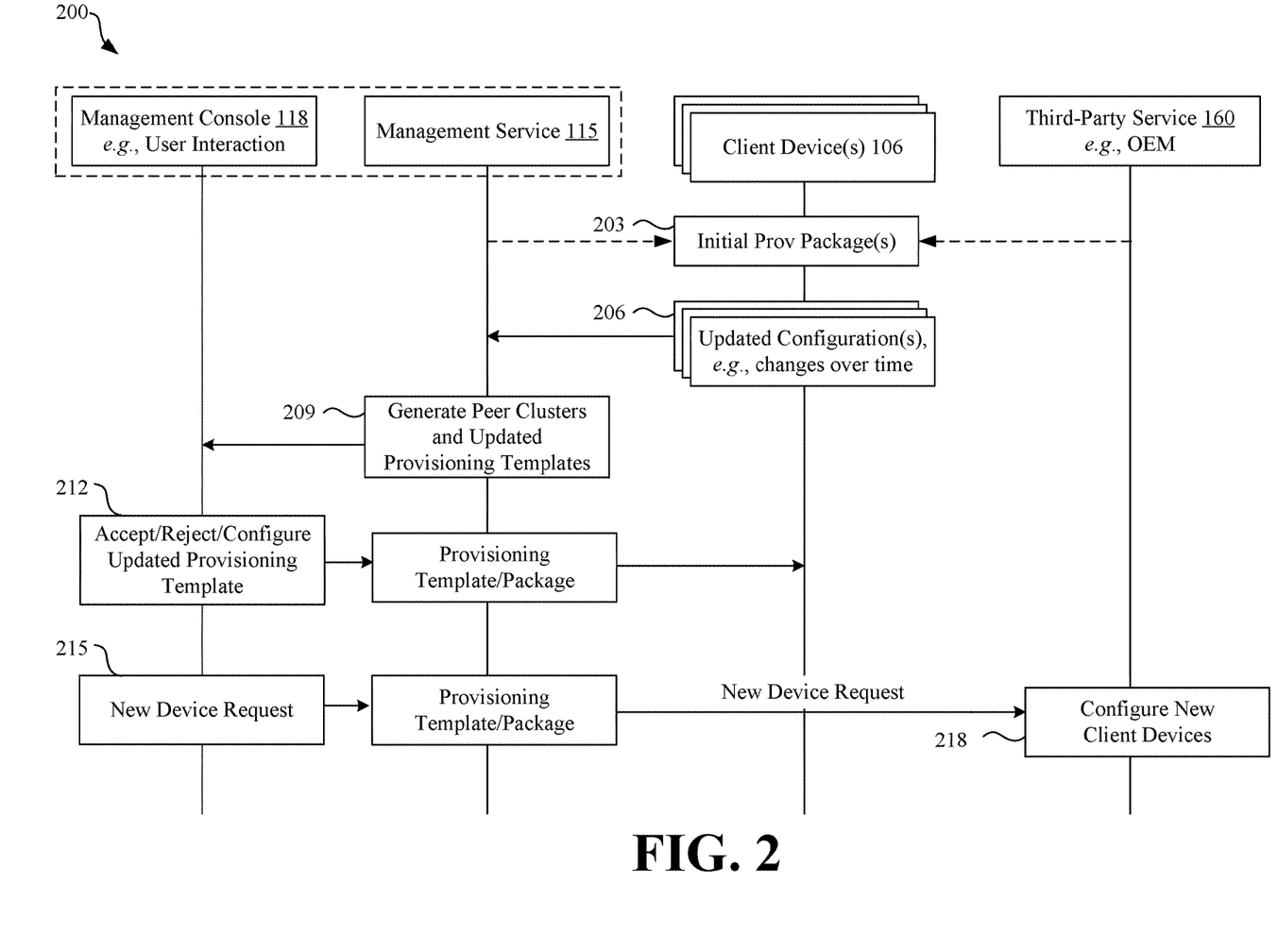
FIG. 2 is a sequence diagram depicting functionalities performed by components of the network environment of FIG. 1.

Turning now to FIG. 2, shown is a sequence diagram 200 illustrating functionalities implemented by components of the networked environment 100. It is understood that the sequence diagram of FIG. 2 provides an example of the many different types of functional arrangements that can be employed to implement the portions of the networked environment 100 as described herein.

The sequence diagram 200 can be viewed as depicting an example of elements of methods or flowcharts implemented by various components of the networked environment 100. Steps of the sequence diagram 200 indicated as performed by the client device 106 can involve execution of instructions including the management component 157 and other instructions by the client device 106. Steps indicated as performed by the management service 115 and management console 118 can involve execution of instructions by the computing environment 103. Steps indicated as performed by the third-party service 160 can be performed and can involve execution of instructions by the third-party system 109.

At step 203, the management service 115 or the third-party service 160 can apply an initial provisioning package 140 to the client device 106 according to a particular firmware and software configuration. For example, the management service 115 can generate a user interface or management console 118 that allows an administrative user to configure or design the initial provisioning package 140. The initial provisioning package 140 can include instructions that install firmware 152 and applications 154 specified in a provisioning template 138. The client device 106 can install the firmware 152 and applications 154. The initial provisioning package 140 can also refer to the firmware 152 and applications 154 that are applied to the client device 106 by the third-party service 160. In some examples, the management service 115 can transmit the initial provisioning package 140, or a provisioning template 138 to the third-party service 160.

At step 206, the client device 106 can transmit updated configurations to the management service 115. For example, the management component 157 can monitor the client device 106 to identify its hardware properties 142, firmware properties 144, and software properties 146. The management component 157 can collect this configuration signature 148 and transmit it to the management service 115. The configuration signature 148 can be provided periodically, on a schedule, in response to a detected update, or in response to a request from the management service 115.

The hardware properties 142, firmware properties 144, and software properties 146 of the client device 106 can change periodically. For example, a user or information technology (IT) professional can install new or updated hardware components including peripherals, hard drive, memory, processor, and other hardware components. The user or IT professional can also update firmware 152 and software that is installed on the client device 106. The management component 157 can detect these changes and transmit a configuration signature 148 to the management service 115.

The management service 115 can receive the updated configurations from the client device 106. In some examples, the management service 115 can periodically transmit a request for the configuration signature 148. In some cases, the request for the configuration signature 148 can refer to a command provided to the client device 106 using a command queue. The management service 115 can maintain a command queue for the client device 106. The management service 115 can place, in the command queue, a command for the client device 106 to transmit a configuration signature 148 to the management service 115. The management component 157 can of the client device 106 can check in and retrieve the command.

At step 209, the management service 115 can generate configuration peer clusters 136 based on the configuration signatures 148 received from the client devices 106. The management service 115 can provide the hardware properties 142, firmware properties 144, and software properties 146 of the configuration signatures 148 as inputs to a clustering algorithm 134. The clustering algorithm 134 can output a number of configuration peer clusters 136 or groups of client devices 106 with similar configuration signatures 148.

The management service 115 can also generate provisioning templates 138 and corresponding provisioning packages 140 based on the configuration signatures 148 received from the client devices 106 according to configuration peer clusters 136 or user groups 132. Some functionalities are discussed with respect to generating or updating a provisioning template 138 based on configuration signatures 148 of client devices 106 corresponding to a configuration peer cluster 136. These functionalities are also applicable to a provisioning template 138 based on client devices 106 corresponding to a configuration peer cluster 136 for a user group 132.

The management service 115 can identify a most-recent or most-updated version of firmware, operating system, and applications indicated for a configuration peer cluster 136. The management service 115 can generate a new or updated provisioning template 138 that includes the most-updated versions of the firmware, operating system, and applications. The management service 115 can also identify a superset of applications installed on the client devices 106 of a configuration peer cluster 136. The management service 115 can generate the provisioning template 138 to include the superset of installed applications.

The management service 115 can also identify a recommended hardware specification based on the configuration signatures 148 received from the client devices 106. The recommended hardware specification can include the highest, median, or mode of hardware specifications among the client devices 106 of a configuration peer cluster 136. The management service 115 can generate the provisioning template 138 to include the recommended hardware specification. The management service 115 can also identify a recommended set of hardware components based on the configuration signatures 148 received from the client devices 106. The recommended set of hardware components can include a superset of hardware components such as input devices, output devices, graphics cards, and others. The recommended set of hardware components can specify the most recent versions of these devices that are identified in the configuration signatures 148. The recommended set of hardware components can specify the amount and type of each of memory, hard drive, processor, and other components that is identified in the configuration signatures 148. In other words, the management service 115 can generate recommendations based on hardware properties 142, firmware properties 144, and software properties 146 that are identified in the configuration signatures 148.

At step 212, the management service 115 can present configurations or recommendations based on the provisioning template 138 through the management console 118. The recommendations can include recommended hardware properties 142, firmware properties 144, and software properties 146.

For example, the management console 118 can present the superset of applications, the recommended set of hardware components, as well as the most-updated versions of the firmware, operating system, and applications. An administrative user can accept, reject, and configure the provisioning template 138. The administrative user can configure the provisioning template 138 by selecting a subset of the recommendations and accepting or rejecting those recommendations. The administrative user can also add applications and specify particular versions of applications through the management console 118.

The management console 118 can include a user interface element that allows an administrative user to accept the presented recommendations. If selected, the management service 115 can finalize the provisioning template 138. The management service 115 can also apply the provisioning template 138 to a specified set of client devices 106. The management service 115 can generate a provisioning template 138 based on client devices 106 of a configuration peer cluster 136 and apply it to the configuration peer cluster 136 or a selected user group 132. A provisioning template 138 generated based on client devices 106 of a user group 132 can be applied to the user group 132 or a selected configuration peer cluster 136.

For firmware and software updates, the management service 115 can generate a provisioning package 140 based on the updates in the provisioning template 138. The management service 115 can transmit a request for the management component 157 to direct installation of the provisioning package 140 on the client device 106. For hardware updates, the management service 115 can submit a ticket or transmit a notification for an IT professional to carry out the hardware updates.

The administrative user can also reject the presented recommendations by selection of a user interface element of the management console 118. For example, since the recommendations can be based on current configuration signatures 148, they can include desirable and undesirable changes from the perspective of the administrative user. The management console 118 can include a user interface element that reverts client devices 106 to a previous provisioning template 138. The management service 115 can revert updated client devices 106 or a subset of updated client devices 106 to revert to previous firmware versions, software versions, and remove undesired software and applications.

For firmware and software reversions, the management service 115 can generate a reversion provisioning package 140 based on a previous provisioning template 138. The management service 115 can transmit a request for the management component 157 to direct installation of the reversion provisioning package 140 on the client device 106. For hardware reversions, the management service 115 can submit a ticket or transmit a notification for an IT professional to carry out the hardware reversions.

At step 215, the management console 118 can generate and transmit a new device request for one or more client devices 106. The management console 118 can provide a user interface element through which an administrative user can request new devices from a third-party service 160. As described above, an administrative user can configure a provisioning template 138 based on the recommendations that are provided through the management console 118. The new device request can include the provisioning template 138 and in some cases a provisioning package 140 that is based on the provisioning template 138. The management console 118 can transmit the new device request to the third-party service 160.

At step 218, the third-party service 160 can configure new client devices 106. The third-party service 160 can receive the new device request that includes the provisioning template 138 and the provisioning package 140. The third-party service 160 can configure new client devices 106 by installing the provisioning package 140 on a new client device 106 with the hardware properties 142 specified by the provisioning template 138.

Figure 3:
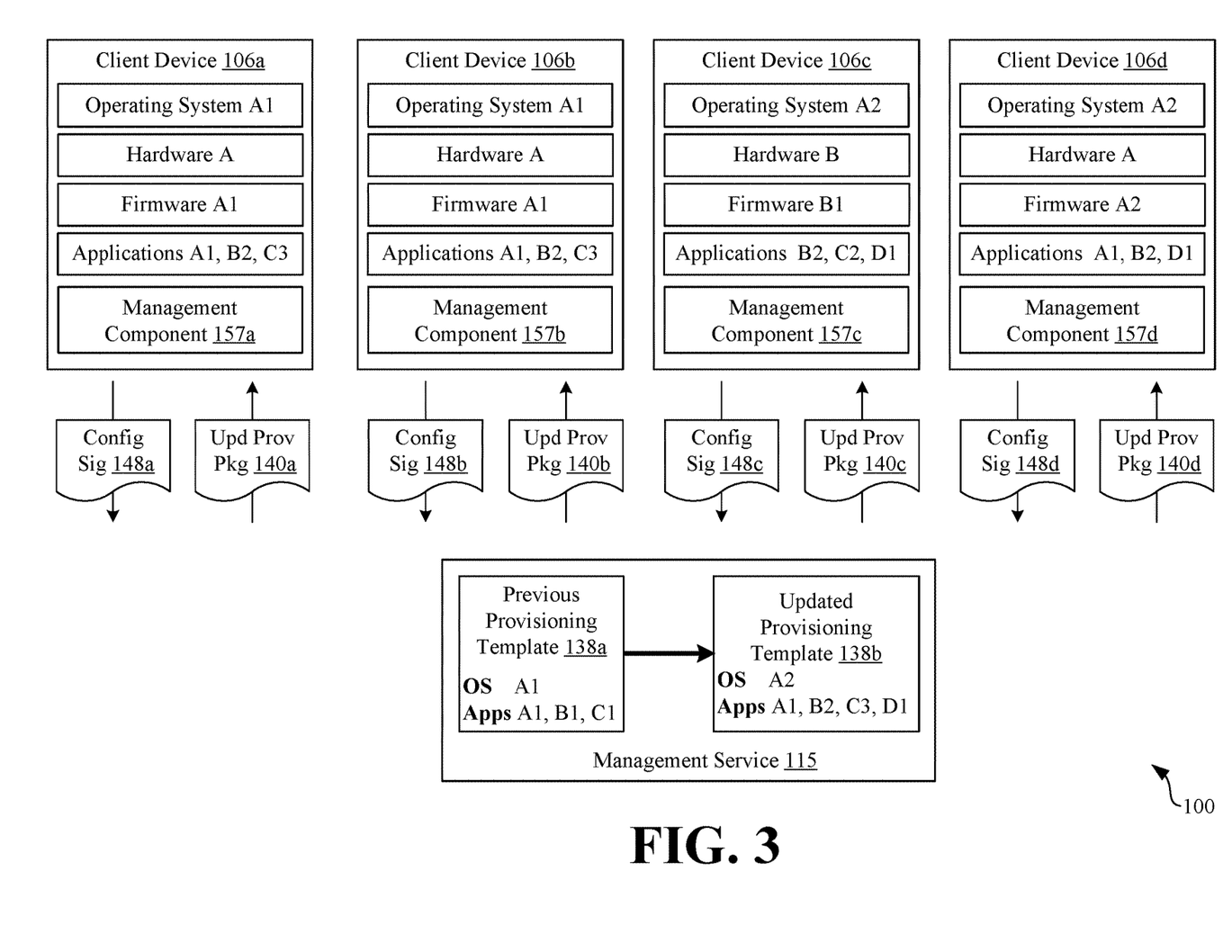
FIG. 3 is a drawing depicting functionalities performed by components of the network environment of FIG. 1.

Moving on to FIG. 3, shown is a drawing that provides one example of the functionalities implemented by components of the networked environment 100. In this example, the networked environment 100 can include the client devices 106a, 106b, 106c, and 106d in communication with the management service 115, and potentially other components. Generally, FIG. 3 shows how the management service 115 generates an updated provisioning template 138b for the set of client devices 106a . . . 106d.

While the updated provisioning template 138b is referred to as "updated," this includes but is not limited to an updated version of a previous provisioning template 138a. Rather, in cases where a previous provisioning template 138a was not previously used to configure the client devices 106a . . . 106d, the management service 115 can nevertheless generate an updated provisioning template 138b that utilizes the most recent or most updated configuration signatures 148.

The previous provisioning template 138a can include an initial provisioning template 138 or any subsequent provisioning template 138 that is utilized to configure one or more of the client devices 106a . . . 106d. The previous provisioning template 138a can specify the operating system A1, and applications A1, B1, and C1. The letters (e.g., A, B, C) can indicate a particular operating system, hardware set, firmware, or application; the numbers following a letter (e.g., A1, A2, A3) can indicate various versions of the operating system, hardware set, firmware, or application. The previous provisioning template 138a can also be configured to specify firmware corresponding to different hardware sets. For example, the previous provisioning template 138a can indicate that the firmware A1 is to be installed for hardware set A, while firmware B1 is to be installed for hardware set B.

Over time, the various client devices 106 can be updated or changed from the initial configuration. For example, the operating systems 149, operating system versions, applications 154, application versions, firmware 152, and firmware versions can be updated or changed. The hardware sets can also be updated. For example, processor, memory, and hard drive can be changed as well as peripheral devices such as a graphics cards, scanners, printers, and other devices.

The client device 106a can include an operating system A1, hardware set A, firmware A1, and Applications A1, B2, and C3. The client device 106a can also include a management component 157a. The client device 106b can include a management component 157b, as well as an operating system A1, hardware set A, firmware A1, and Applications A1, B2, and C3. The client device 106c can include a management component 157c, as well as an operating system A2, hardware set B, firmware B1, and Applications B2, C2, and D1. The client device 106d can include a management component 157d, as well as an operating system A2, hardware set A, firmware A2, and Applications A1, B2, and D1.

The management component 157a can transmit configuration signature 148a to the management service 115. The configuration signature 148a can specify the hardware properties 142, firmware properties 144, and software properties 146 of the client device 106a. Specifically, the configuration signature 148a can specify that the client device 106a includes operating system A1, hardware set A, firmware A1, and Applications A1, B2, and C3.

The management component 157b can transmit configuration signature 148b to the management service 115. The configuration signature 148b can specify the hardware properties 142, firmware properties 144, and software properties 146 of the client device 106b. The configuration signature 148*b* can specify that the client device 106*b* includes operating system A1, hardware set A, firmware A1, and Applications A1, B2, and C3.

The management component 157*c* can transmit configuration signature 148*c* to the management service 115. The configuration signature 148*c* can specify the hardware properties 142, firmware properties 144, and software properties 146 of the client device 106*c*. The configuration signature 148*c* can specify that the client device 106*c* includes operating system A2, hardware set B, firmware B1, and Applications B2, C2, and D1.

The management component 157*d* can transmit configuration signature 148*d* to the management service 115. The configuration signature 148*d* can specify the hardware properties 142, firmware properties 144, and software properties 146 of the client device 106*d*. The configuration signature 148*d* can specify that the client device 106*d* includes operating system A2, hardware set A, firmware A2, and Applications A1, B2, and D1. The management components 157*a* . . . 157*d* can transmit configuration signatures 148 periodically, according to a schedule, in response to detected changes, and in response to requests and commands from the management service 115. In other words, the configuration signatures 148*a* . . . 148*d* can include hardware properties 142, firmware properties 144, and software properties 146 corresponding to the client devices 106*a* . . . 106*d*.

The management service 115 can receive the configuration signatures 148*a* . . . 148*d*. The management service 115 can then generate the updated provisioning template 138*b* based on the most recent or updated configuration signatures 148*a* . . . 148*d*. In some cases, the client devices 106*a* . . . 106*d* can represent a set of client devices 106 corresponding to a user group 132. In other words, the client devices 106*a* . . . 106*d* can be devices registered in association with user accounts that are assigned to the user group 132. The client devices 106*a* . . . 106*d* can also represent a set of client devices 106 corresponding to a configuration peer group or cluster 134. In other words, the client devices 106*a* . . . 106*d* can be devices that are aggregated into a configuration peer cluster 134 out of a larger set of client devices 106 according to a clustering algorithm 134.

The management service 115 can generate the updated provisioning template 138*b* to include the most-recent or most-updated version of firmware, operating system, and applications specified by configuration signatures 148*a* . . . 148*d*. For example, the firmware A2 can be a more recent firmware version than firmware A1 corresponding to or supported by the hardware of hardware set A. The management service 115 can generate the updated provisioning template 138*b* to specify firmware A2 as the most recent firmware version for hardware set A. Firmware B1 can be a most recent firmware version for the hardware in hardware set B, so the management service 115 can generate the updated provisioning template 138*b* to specify firmware B1 for hardware set B. The management service 115 can identify that the operating system A2 is the most recent version of an operating system A indicated by the configuration signatures 148*a* . . . 148*d*. The management service 115 can generate the updated provisioning template 138*b* to specify operating system A2.

The management service 115 can also generate the updated provisioning template 138*b* to include the superset of applications specified by configuration signatures 148*a* . . . 148*d*. For example, the superset of applications can include applications A, B, C, and D. However, there are also multiple versions of some of these applications, so the management service 115 can identify the most recent version of each application of the superset of applications specified by configuration signatures 148*a* . . . 148*d*. Accordingly, the management service 115 can generate an updated provisioning template 138*b* to include applications A1, B2, C3, and D1.

The management service 115 can also generate the updated provisioning template 138*b* to include a recommended hardware specification based on the configuration signatures 148 received from the client devices 106. The recommended hardware specification can include the highest, median, or mode of hardware specifications among the client devices 106*a* . . . 106*d*. The management service 115 can generate the updated provisioning template 138*b* to include the recommended hardware specification. The management service 115 can also identify a recommended set of hardware components based on the configuration signatures 148 received from the client devices 106*a* . . . 106*d*. The recommended set of hardware components can include a superset of hardware components such as input devices, output devices, graphics cards, and others. The recommended set of hardware components can specify the most recent versions of these devices that are identified in the configuration signatures 148. The recommended set of hardware components can specify the amount and type of each of memory, hard drive, processor, and other components that are identified in the configuration signatures 148. In other words, the management service 115 can generate recommendations based on hardware properties 142, firmware properties 144, and software properties 146 that are identified from the configuration signatures 148.

The management service 115 can then apply the updated provisioning template 138*b* to the client devices 106*a* . . . 106*d*. For example, the management service 115 can transmit updated provisioning packages 140*a* . . . 140*d* corresponding to the updated provisioning template 138*b*. The updated provisioning packages 140*a* . . . 140*d* can include the data and instructions necessary to obtain and install the firmware, applications, operating systems specified by the updated provisioning template 138*b*. Where hardware changes are recommended, management service can also transmit a request or notification for an IT professional to update hardware 150 on the client devices 106*a* . . . 106*d* according to the updated provisioning template 138*b*.

In some examples, the updated provisioning packages 140*a* . . . 140*d* can be individualized for the corresponding client devices 106*a* . . . 106*d*. The management service 115 can identify differences between the configuration signature 148*a* and the updated provisioning template 138*b*, and generate the updated provisioning package 140*a* to include data and instructions required to correct the differences in firmware, applications, and operating systems. For example, the updated provisioning package 140*a* can include data comprising the firmware, applications, and operating systems, or respective links such as URLs from which the firmware, applications, and operating systems can be retrieved.

Alternatively, the management service 115 can transmit updated provisioning packages 140*a* . . . 140*d* that include data and instructions required for all firmware, applications, and operating systems specified in the updated provisioning template 138*b*. The respective management components 157*a* . . . 157*d* can identify differences between the current configuration of a corresponding client device 106*a* . . . 106*d* and the updated provisioning template 138*b*. The respective management components 157*a* . . . 157*d* can then retrieve the appropriate firmware, applications, and operating systems and proceed with installation.

Figure 4:
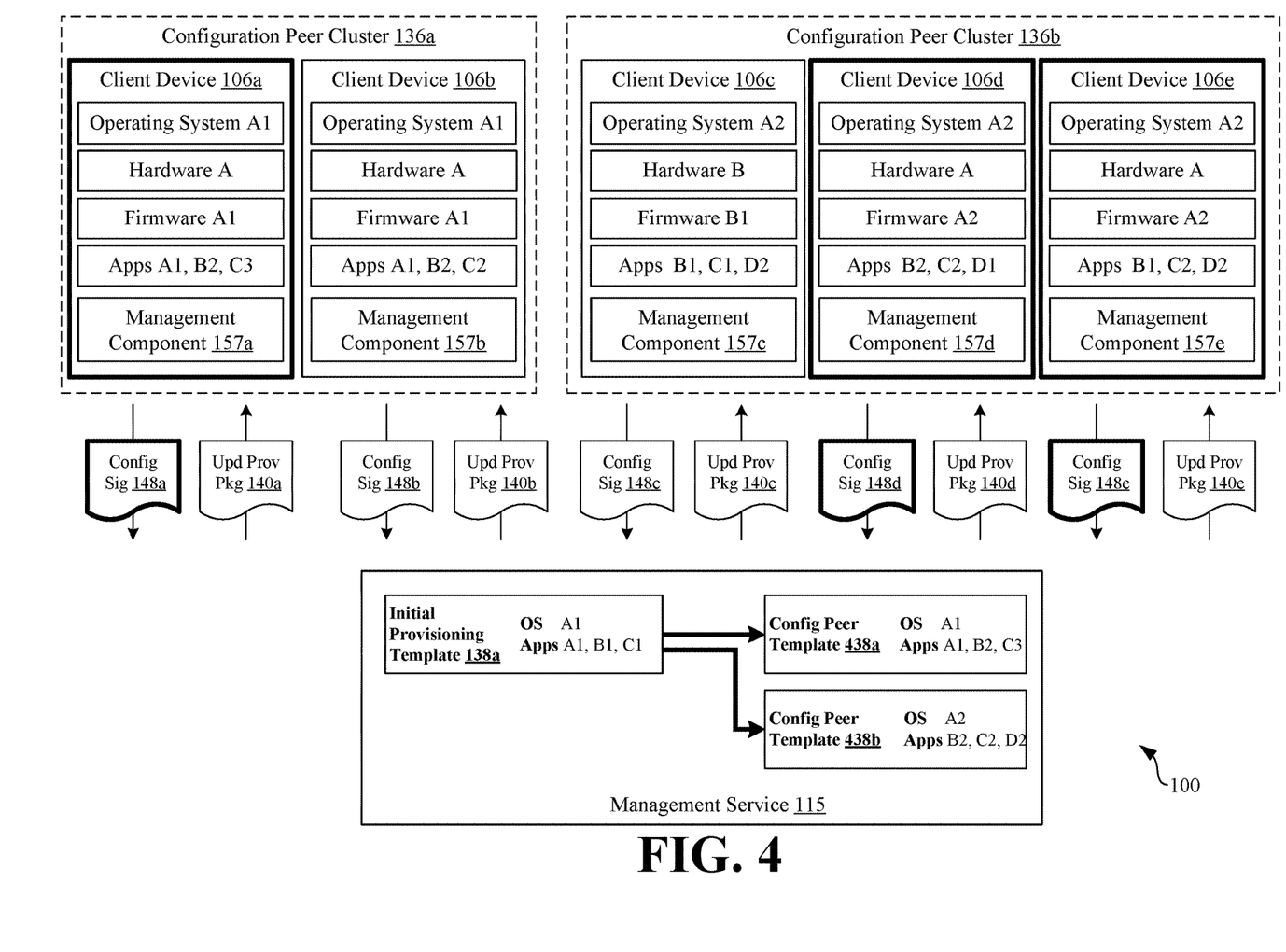
FIG. 4 is another drawing depicting functionalities implemented by components of the network environment of FIG. 1.

FIG. 4, shows a drawing that provides another example of the functionalities implemented by components of the networked environment 100. The networked environment 100 can include the client devices 106a, 106b, 106c, 106d, and 106e in communication with the management service 115, and potentially other components. Generally, FIG. 4 shows how the management service 115 can generate configuration peer clusters 136a and 136b and corresponding configuration peer templates 438a and 438b. The configuration peer templates 438 can refer to provisioning templates 138 that are specific to a configuration peer clusters 136a and 136b.

The previous provisioning template 138a can include an initial provisioning template 138 or any subsequent provisioning template 138 that is utilized to configure one or more of the client devices 106a . . . 106e. The previous provisioning template 138a can specify the operating system A1, and applications A1, B1, and C1. The previous provisioning template 138a can also be configured to specify firmware corresponding to different hardware sets. For example, the previous provisioning template 138a can indicate that the firmware A1 is to be installed for hardware set A, while firmware B1 is to be installed for hardware set B. Alternatively, the provisioning template 138a can specify a particular hardware set A and corresponding firmware A1. In these cases, the hardware set B can refer to an updated hardware set.

Over time, the various client devices 106 can be updated or changed from the initial configuration. For example, the operating systems 149, operating system versions, applications 154, application versions, firmware 152, and firmware versions can be updated or changed. The hardware sets can also be updated. For example, the processor, memory, and hard drive can be changed as well as peripheral devices such as graphics cards, scanners, printers, and other devices.

The client device 106a can include an operating system A1, hardware set A, firmware A1, and Applications A1, B2, and C3. The client device 106a can also include a management component 157a. The client device 106b can include a management component 157b, as well as an operating system A1, hardware set A, firmware A1, and Applications A1, B2, and C2. The client device 106c can include a management component 157c, as well as an operating system A2, hardware set B, firmware B1, and Applications B1, C1, and D2. The client device 106d can include a management component 157d, as well as an operating system A2, hardware set A, firmware A2, and Applications B2, C2, and D1. The client device 106e can include a management component 157e, as well as an operating system A2, hardware set A, firmware A2, and Applications B1, C2, and D2.

The management component 157a can transmit configuration signature 148a to the management service 115. The configuration signature 148a can specify the hardware properties 142, firmware properties 144, and software properties 146 of the client device 106a. Specifically, the configuration signature 148a can specify that the client device 106a includes operating system A1, hardware set A, firmware A1, and Applications A1, B2, and C3.

The management component 157b can transmit configuration signature 148b to the management service 115. The configuration signature 148b can specify the hardware properties 142, firmware properties 144, and software properties 146 of the client device 106b. The configuration signature 148b can specify that the client device 106b includes operating system A1, hardware set A, firmware A1, and Applications A1, B2, and C2.

The management component 157c can transmit configuration signature 148c to the management service 115. The configuration signature 148c can specify the hardware properties 142, firmware properties 144, and software properties 146 of the client device 106c. The configuration signature 148c can specify that the client device 106c includes operating system A2, hardware set B, firmware B1, and Applications B1, C1, and D2.

The management component 157d can transmit configuration signature 148d to the management service 115. The configuration signature 148d can specify the hardware properties 142, firmware properties 144, and software properties 146 of the client device 106d. The configuration signature 148d can specify that the client device 106d includes operating system A2, hardware set A, firmware A2, and Applications B2, C2, and D1.

The management component 157e can transmit configuration signature 148e to the management service 115. The configuration signature 148e can specify the hardware properties 142, firmware properties 144, and software properties 146 of the client device 106e. The configuration signature 148e can specify that the client device 106e includes operating system A2, hardware set A, firmware A2, and Applications B1, C2, and D2.

The management components 157a . . . 157e can transmit configuration signatures 148 periodically, according to a schedule, in response to detected changes, and in response to requests and commands from the management service 115. In other words, the configuration signatures 148a . . . 148e can include hardware properties 142, firmware properties 144, and software properties 146 corresponding to the client devices 106a . . . 106e.

The management service 115 can receive the configuration signatures 148a . . . 148e. The management service 115 can then generate the configuration peer clusters 136a and 136b from the client devices 106a . . . 106e. For example, the management service 115 can input the hardware properties 142, firmware properties 144, and software properties 146 corresponding to the client devices 106a . . . 106e into a clustering algorithm 134. The clustering algorithm 134 can output the configuration peer clusters 136a and 136b.

The management service 115 can generate the configuration peer template 438a based on the client devices 106a and 106b of the configuration peer cluster 136a. The management service 115 can generate the configuration peer template 438b based on the client devices 106c, 106d, and 106e of the configuration peer cluster 136b. Alternatively, one or more representative device can be user-selected through the management console 118, from the client device 106 of each configuration peer cluster 136. For example, the client device 106a, indicated in bold, can be selected as a group or cluster representative device for the configuration peer cluster 136a. The client devices 106d and 106e can be selected as representative devices for configuration peer cluster 136b. In that situation, the management service 115 can generate the configuration peer templates 438a and 438b based on the configuration signatures 148 of the representative device or devices for the corresponding group or cluster. In some examples, in order to reduce network and compute overhead, only the representative devices transmit configuration signatures 148 while other client devices 106 refrain.

The management service 115 can generate the configuration peer template 438a to include the most-recent or most-updated version of firmware, operating system, and applications specified by configuration signatures 148a and 148b. The management service 115 can generate the configuration peer template 438a to specify firmware A1 as the most recent firmware version for hardware set A that is specified by configuration signatures 148a and 148b.

The management service 115 can identify that operating system A1 is the most recent version of an operating system A indicated by the configuration signatures 148a and 148b. The management service 115 can generate the configuration peer template 438a to specify operating system A1. The management service 115 can also generate the configuration peer template 438a to include the superset of applications specified by configuration signatures 148a and 148b. For example, the superset of applications can include applications A, B, and C. However, there are also multiple versions of some of these applications, so the management service 115 can identify the most recent version of each application of the superset of applications specified by configuration signatures 148a and 148b. Accordingly, the management service 115 can generate configuration peer template 438a to include applications A1, B2, and C3.

The management service 115 can also generate the configuration peer template 438a to include a recommended hardware specification based on the configuration signatures 148a and 148b. The recommended hardware specification can include the highest, median, or mode of hardware specifications among the client devices 106a and 106b. The management service 115 can generate the configuration peer template 438a to include the recommended hardware specification. The management service 115 can also identify a recommended set of hardware components based on the configuration signatures 148 received from the client devices 106a and 106b. The recommended set of hardware components can include a superset of hardware components such as input devices, output devices, graphics cards, and others. The recommended set of hardware components can specify the most recent versions of these devices that are identified in the configuration signatures 148a and 148b. The recommended set of hardware components can specify the amount and type of each of the memory, hard drive, processor, and other components that are identified in the configuration signatures 148a and 148b.

The management service 115 can generate the configuration peer template 438b to include the most-recent or most-updated version of firmware, operating system, and applications specified by configuration signatures 148c . . . 148e. The management service 115 can generate the configuration peer template 438b to specify that firmware A2 is the most recent firmware version for hardware set A and firmware B1 is the most recent firmware version for hardware set B. The management service 115 can identify that operating system A2 is the most recent version of an operating system A indicated by the configuration signatures 148c . . . 148e. The management service 115 can generate the configuration peer template 438b to specify operating system A2.

The management service 115 can also generate the configuration peer template 438b to include the superset of applications specified by configuration signatures 148c . . . 148e. For example, the superset of applications can include applications B, C, and D. However, there are also multiple versions of some of these applications, so the management service 115 can identify the most recent version of each application of the superset of applications specified by configuration signatures 148c . . . 148e. Accordingly, the management service 115 can generate configuration peer template 438b to include applications B2, C2, and D2.

The management service 115 can also generate the configuration peer template 438b to include a recommended hardware specification based on the configuration signatures 148c . . . 148e. The recommended hardware specification can include the highest, median, or mode of hardware specifications among the client devices 106c . . . 106e. The management service 115 can generate the configuration peer template 438a to include the recommended hardware specification. The management service 115 can also identify a recommended set of hardware components based on the configuration signatures 148 received from the client devices 106c . . . 106e. The recommended set of hardware components can include a superset of hardware components such as input devices, output devices, graphics cards, and others. The recommended set of hardware components can specify the most recent versions of these devices that are identified in the configuration signatures 148c . . . 148e. The recommended set of hardware components can specify the amount and type of each of the memory, hard drive, processor, and other components that are identified in the configuration signatures 148c . . . 148e.

The management service 115 can apply the configuration peer template 438a to the client devices 106a and 106b, and apply the configuration peer template 438b to the client devices 106c . . . 106e. For example, the management service 115 can transmit updated provisioning packages 140a . . . 140e to the management components 157a . . . 157e. The updated provisioning packages 140a . . . 140e can include the data and instructions necessary to obtain and install the firmware, applications, operating systems specified. Where hardware changes are recommended, the management service 115 can also transmit a request or notification for an IT professional to update hardware 150 on the client devices 106a . . . 106e.

Figure 5:
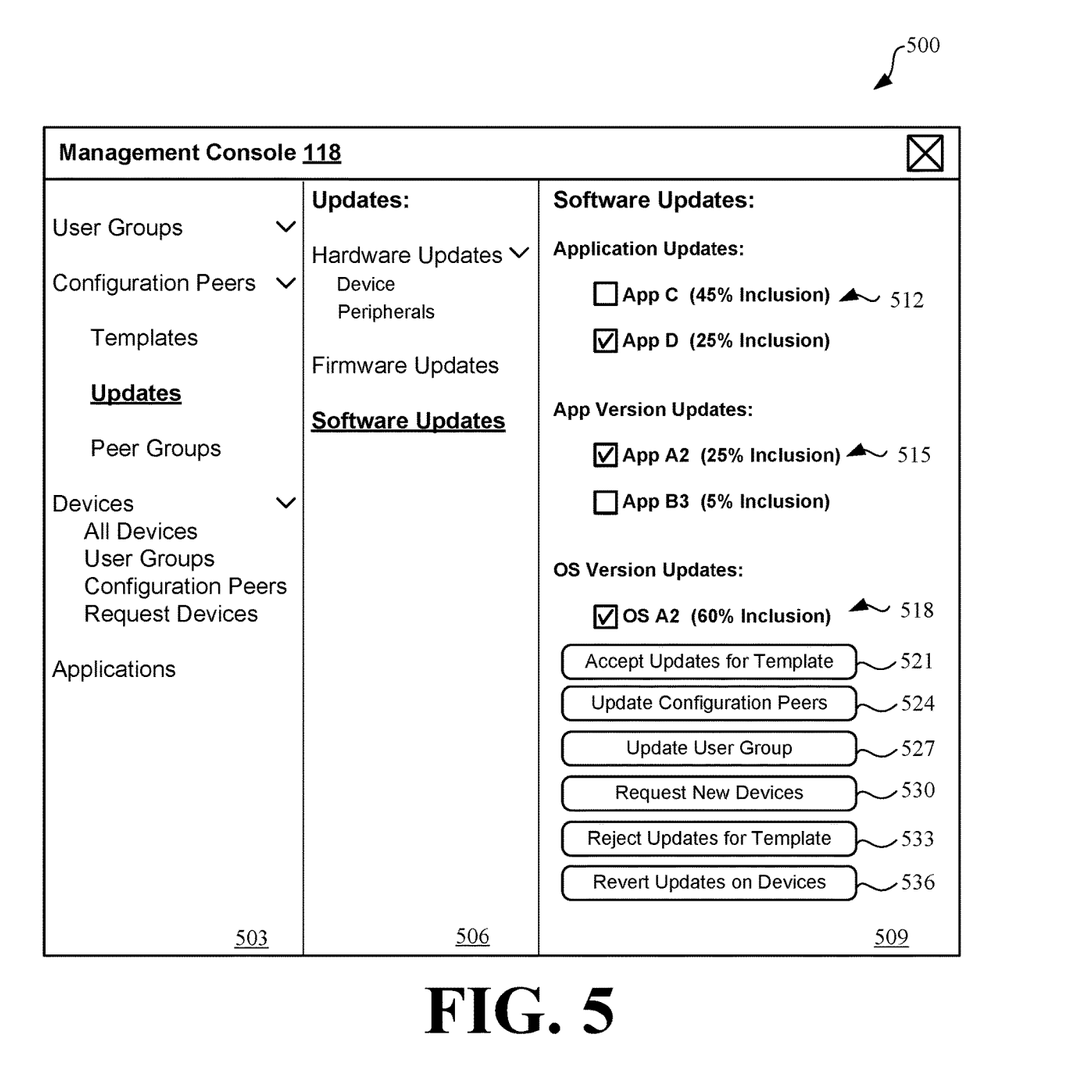
FIG. 5 is a drawing depicting a user interface depicting functionalities implemented by components of the network environment of FIG. 1.

FIG. 5 is a drawing that shows a user interface 500 depicting functionalities implemented by components of the network environment 100 of FIG. 1. The user interface 500 can include a user interface of the management console 118. The user interface 500 can be accessed through a device of the computing environment 103 or a client device 106. The user interface 500 can include areas or sections 503, 506, and 509, which are described for discussion purposes. The user interface section 503 can include a number of selectable categories including "user groups," "configuration peers," "devices," and "applications." Each of the selectable categories can, when selected by a user, update the user interface 500 to display configurations and recommendations for the client devices 106, organized according to the selected category.

The "configuration peers" category can include a drop-down menu that lists subcategories "templates," "updates," and "peer groups." A user selection of "updates" can cause the user interface section 506 to show user-selectable types of updates or recommendations that are generated by the management service 115. The user-selectable types of updates or recommendations can include "hardware updates," "firmware updates," and "software updates." A user selection of the "software updates" can cause the user interface section 509 to show recommended software updates corresponding to an updated provisioning template 138.

The user interface section 509 can include application updates, application version updates, and operating system version updates. The application updates can show new applications that are installed on the client devices 106 since a previous provisioning template 138. Each new application can show an adoption rate or inclusion rate, as well as a user interface element 512 that allows a user to select or deselect the new application for acceptance or rejection.

The application version updates can include versions of a particular application that have been updated or changed since the previous provisioning template 138. Each version of the application can show an adoption rate or inclusion rate, as well as a user interface element 515 that allows a user to select or deselect the new application for acceptance or rejection.

The operating system version updates can include versions of a particular operating system that have been updated or changed since the previous provisioning template 138. Each version of the operating system can show an adoption rate or inclusion rate, as well as a user interface element 518 that allows a user to select or deselect the new application for acceptance or rejection.

The user interface 500 can also include a user interface element 521 that when selected, accepts selected recommendations for inclusion in a provisioning template 138. The user interface 500 can also include a user interface element 524 that when selected, causes a configuration peer cluster 136 to install the selected recommendations. The user interface 500 can also include a user interface element 527 that when selected, causes a user group 132 to install the selected recommendations. The user interface 500 can also include a user interface element 530 that when selected, transmits a new device request to a third-party service 160, based on the selected recommendations. The user interface 500 can also include a user interface element 533 that when selected, rejects selected recommendations for inclusion in a provisioning template 138. The user interface 500 can also include a user interface element 536 that when selected, reverts client devices 106 to remove the selected or unselected recommendations and revert to a previous provisioning template 138.

Figure 6:
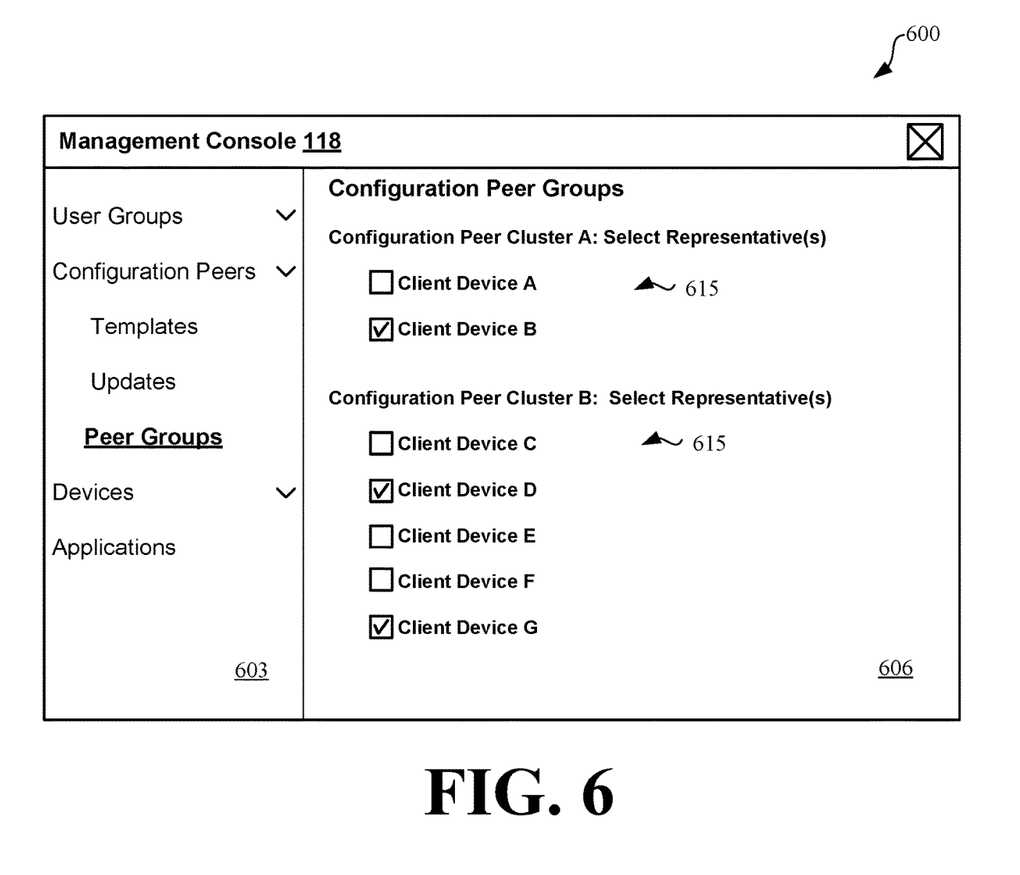
FIG. 6 is another drawing depicting a user interface depicting functionalities implemented by components of the network environment of FIG. 1.

FIG. 6 is a drawing that shows a user interface 600 depicting functionalities implemented by components of the network environment 100 of FIG. 1. The user interface 600 can include a user interface of the management console 118. The user interface 600 can be accessed through a device of the computing environment 103 or a client device 106. The user interface 600 can include areas or sections 603 and 606, which are described for discussion purposes.

The user interface section 603 can include a number of selectable categories including "user groups," "configuration peers," "devices," and "applications." Each of the selectable categories can, when selected by a user, update the user interface 600 to display configurations and recommendations for the client devices 106, organized according to the selected category.

The "configuration peers" category can include a drop-down menu that lists subcategories "templates," "updates," and "peer groups." A user selection of "peer groups" can cause the user interface section 606 to show configuration peer clusters 136 that are generated by the management service 115. For example, the user interface section 606 can show that the client devices 106 are separated into peer cluster A and peer cluster B. The user interface section 606 can indicate that peer cluster A includes client devices A and B, while peer cluster B includes client devices C, D, E, F, and G. The letters A . . . G can be representative of a client device identifier. Each of the client device identifiers can be shown in association with a user interface element 615 that enables a user to select the corresponding client device to be a representative device for the peer cluster to which it is assigned or associated.

The client devices 106 and the devices comprising the computing environment 103 and third-party system 109 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the management console 118, the management component 157, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 115, management console 118, the management component 157, third-party service 160, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram of FIG. 2 shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram of FIG. 2 shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device comprising at least one processor; and
    at least one non-transitory memory comprising machine-readable instructions, wherein the instructions, when executed by the at least one processor, cause the at least one computing device to at least:
        receive a plurality of device configuration signatures, a respective device configuration signature comprising a software configuration that specifies applications installed on a corresponding client device;
        generate a provisioning template based on the plurality of device configuration signatures, wherein the provisioning template comprises a superset of applications specified by at least a subset of the plurality of device configuration signatures corresponding to a group of client devices;
        generate a user interface comprising a recommendation to apply the provisioning template to at least one client device; and
        transmit a request to install a provisioning package to the at least one client device, wherein the provisioning package is based on the provisioning template.

2. The system of claim 1, wherein the respective device configuration signature comprises a hardware configuration, a firmware configuration, and the software configuration.

3. The system of claim 1, wherein the instructions, when executed by the at least one processor, cause the at least one computing device to at least:
    identify a previous provisioning template utilized to configure at least one of a plurality of client devices;
    determine at least one software update between the superset of applications specified in the plurality of device configuration signatures and a set of applications specified in the previous provisioning template.

4. The system of claim 3, wherein the instructions, when executed by the at least one processor, cause the at least one computing device to at least:
    generate the user interface to present the at least one software update; and
    identify a user selection of a user interface element that indicates acceptance of the at least one software update.

5. The system of claim 1, wherein the instructions, when executed by the at least one processor, cause the at least one computing device to at least:
    provide the plurality of device configuration signatures as input to a grouping algorithm that generates a plurality of configuration peer groups.

6. The system of claim 5, wherein the at least one client device is identified based on being assigned to a particular configuration peer group of the plurality of configuration peer groups.

7. The system of claim 1, wherein the at least one client device is identified based on being assigned to a particular user group maintained by a management service.

8. A non-transitory computer-readable medium comprising machine-readable instructions, wherein the instructions, when executed by at least one processor, cause at least one computing device to at least:
    receive a plurality of device configuration signatures, a respective device configuration signature comprising a software configuration that specifies applications installed on a corresponding client device;
    generate a provisioning template based on the plurality of device configuration signatures, wherein the provisioning template comprises a superset of applications specified by at least a subset of the plurality of device configuration signatures corresponding to a group of client devices;

generate a user interface comprising a recommendation to apply the provisioning template to at least one client device; and transmit a request to install a provisioning package to the at least one client device, wherein the provisioning package is based on the provisioning template.

9. The non-transitory computer-readable medium of claim 8, wherein the respective device configuration signature comprises a hardware configuration, a firmware configuration, and the software configuration.

10. The non-transitory computer-readable medium of claim 8, wherein the instructions, when executed, cause the at least one computing device to at least:

identify a previous provisioning template utilized to configure at least one of a plurality of client devices;

determine at least one software update between the superset of applications specified in the plurality of device configuration signatures and a set of applications specified in the previous provisioning template.

11. The non-transitory computer-readable medium of claim 10, wherein the instructions, when executed, cause the at least one computing device to at least:

generate the user interface to present the at least one software update; and identify a user selection of a user interface element that indicates acceptance of the at least one software update.

12. The non-transitory computer-readable medium of claim 8, wherein the instructions, when executed, cause the at least one computing device to at least:

provide the plurality of device configuration signatures as input to a grouping algorithm that generates a plurality of configuration peer groups.

13. The non-transitory computer-readable medium of claim 12, wherein the group of client devices corresponds to a configuration peer group of the plurality of configuration peer groups.

14. The non-transitory computer-readable medium of claim 12, wherein the at least one client device is assigned to a configuration peer group of the plurality of configuration peer groups.

15. A method performed by instructions executed by at least one processor of at least one computing device, the method comprising:

receiving a plurality of device configuration signatures, a respective device configuration signature comprising a software configuration that specifies applications installed on a corresponding client device;

generating a provisioning template based on the plurality of device configuration signatures, wherein the provisioning template comprises a superset of applications specified by at least a subset of the plurality of device configuration signatures corresponding to a group of client devices;

generating a user interface comprising a recommendation to apply the provisioning template to at least one client device; and transmitting a request to install a provisioning package to the at least one client device, wherein the provisioning package is based on the provisioning template.

16. The method of claim 15, wherein the respective device configuration signature comprises a hardware configuration, a firmware configuration, and the software configuration.

17. The method of claim 15, wherein the instructions, when executed by the at least one processor, cause the at least one computing device to at least:

identify a previous provisioning template utilized to configure at least one of a plurality of client devices;

determine at least one software update between the superset of applications specified in the plurality of device configuration signatures and a set of applications specified in the previous provisioning template.

18. The method of claim 17, wherein the instructions, when executed by the at least one processor, cause the at least one computing device to at least:

generate the user interface to present the at least one software update; and identify a user selection of a user interface element that indicates acceptance of the at least one software update.

19. The method of claim 17, wherein the request to install the provisioning package to the at least one client device is transmitted to a management component of the at least one client device, and the management component causes the at least one client device to install the provisioning package.

20. The method of claim 17, wherein the request to install the provisioning package to the at least one client device is transmitted to a third-party service associated with a manufacturer of the at least one client device, and wherein the provisioning package is installed to the at least one client device during a manufacturing process.

* * * * *